United States Patent Office 2,820,086
Patented Jan. 14, 1958

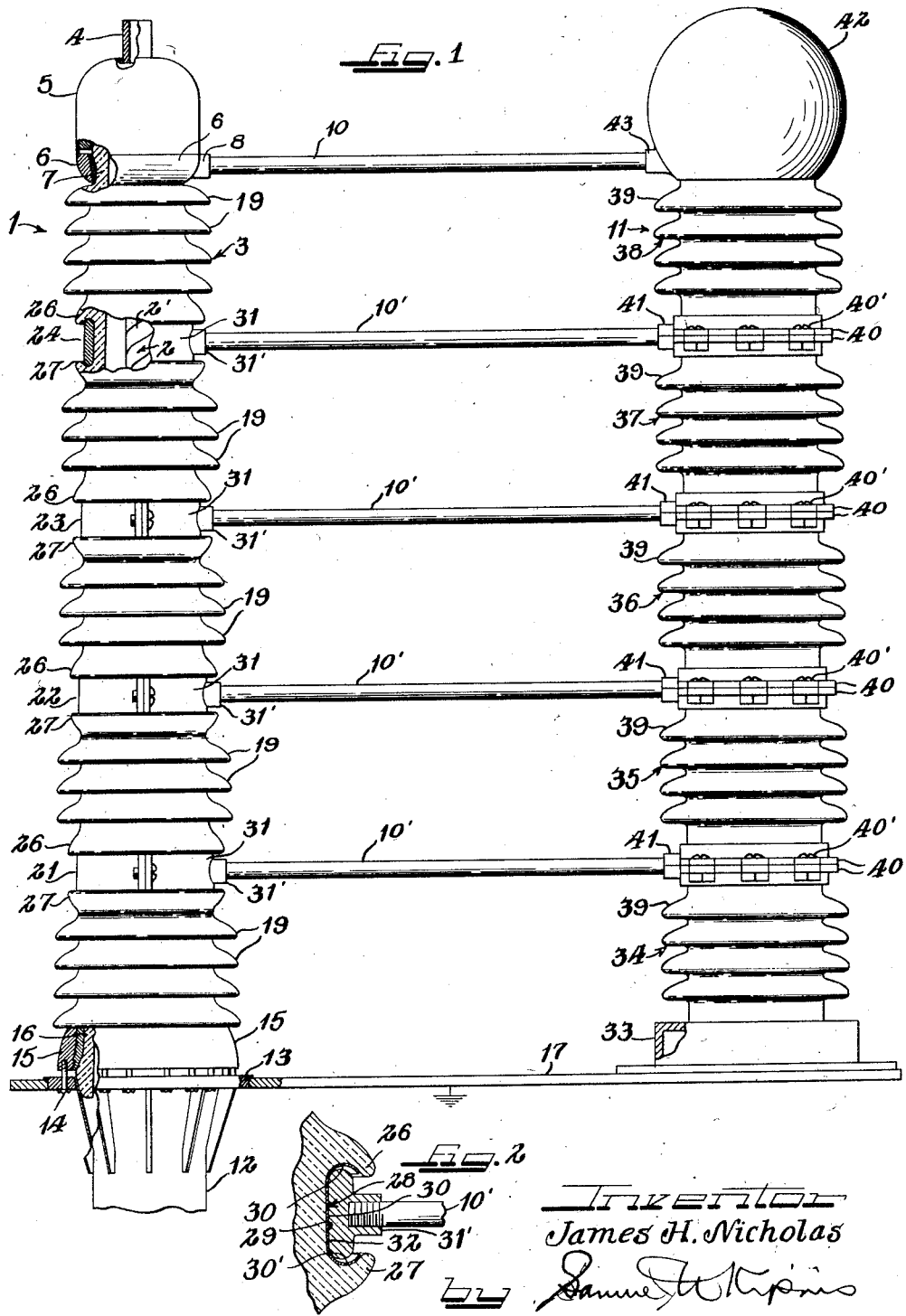

2,820,086

EXTERNAL POTENTIAL GRADIENT CONTROL FOR HIGH VOLTAGE CABLE TERMINATOR OR BUSHING

James H. Nicholas, Chicago, Ill., assignor to G & W Electric Specialty Company, Chicago, Ill., a corporation of Illinois Application June 20, 1955, Serial No. 516,427

8 Claims. (Cl. 174—140)

This invention relates to high voltage electric potheads such as are used for terminating the end of an insulated conductor, particularly a cable conductor, or for terminating a conductor constituting one terminal of a high voltage transformer or circuit breaker. The present invention is particularly useful in connection with potheads or cable terminations operating at very high voltages, for example, 345 kilovolts.

In the fabrication of potheads or terminators, the sheath and screening surrounding the cable insulation is removed from an appropriate length of the cable end leaving the cable insulation exposed. The exposed cable insulation is suitably prepared by application of stress control cones or the like in the vicinity of the cut back ends of the cable sheath and screening. The cable end is then surrounded by a suitable insulator bushing having the usual axially spaced insulating skirts. The lower end of the insulator bushing is mounted on a grounded metal support. At the upper end of the insulator bushing is a line terminal to which is connected the end of the cable conductor and an external transmission line.

The outer insulator bushing and internal insulation must withstand the axial voltage gradient existing between the cable conductor and ground. To minimize the length of the insulator bushing required to withstand this potential difference, the potential gradient of the insulator bushing should be uniform along the length thereof.

It is one of the objects of this invention to provide means for improving the voltage distribution, in an axial direction, internally and externally of the pothead, utilizing an external voltage control unit, preferably a condenser stack of a type used in high voltage transmission systems, mounted adjacent to the terminator.

In accordance with a preferred aspect of the invention, the insulator skirts are omitted from points along the length of the insulator bushing and the insulator surface is coated with a conductive glaze at these points. A separate stack of series connected capacitor units is mounted adjacent to the terminator, and the capacitor stack is connected between the aforementioned cable conductor terminal and ground. Connections are also made between intermediate terminals of the capacitor stack and the glazed areas on the insulator bushing to control the voltage distribution axially along the bushing and thus also controlling the voltage distribution axially within the bushing. Due to the flow of progressively increasing capacitive currents proceeding toward the grounded end of the terminator, the capacitance of the capacitors in the stack are made of progressively increasing value from the high voltage end of the stack. In this maner, the voltage gradient lengthwise of the insulator bushing is uniform.

Other objects, advantages and features of the invention will become apparent upon making reference to the specification to follow, taken in conjunction with the drawings wherein:

Fig. 1 is an elevational view of a terminator and capacitor stack forming a preferred embodiment of the invention; and Fig. 2 is a fragmentary enlarged section through part of the outer insulator bushing of the terminator.

Reference should now be made to the drawings where similar reference numerals indicate similar elements throughout.

In Fig. 1 is shown a terminator structure 1 including a slightly tapered outer insulator bushing 3 which encloses the end portion of a cable 2 entering the terminator from the bottom thereof. The cable end may be prepared in any suitable manner well known in the art. One method is to remove a portion of the cable shielding braid and shielding to leave exposed cable covering insulation 2'. The covering insulation may be suitably prepared in a manner well known in the art, as by the addition of a stress control cone adjacent to the cut-back end of the shielding braid. The latter is usually located near the bottom of the terminator, as shown in co-pending application Serial No. 219,294, filed April 4, 1951, on a "High Voltage Electric Terminator." The cable conductor is connected to a terminal located within the insulator at the top of the terminator. The cable terminal connects with an overhead conductor which enters the top of the terminator through a line terminal 4. The line terminal 4 is connected to a hollow metal shield piece 5 which is mounted above a metal adaptor ring 6 secured to the upper neck 7 of the outer insulator bushing. The adaptor ring 6 has an internally threaded boss 8 for receiving the threaded end of a metal connector rod 10.

The outer insulator bushing 3 is supported on a grounded metal support 12 having a metal mounting flange 13, as by screws 14, and a metal adaptor ring 15 at the bottom of a neck 16 of the bushing 3.

The terminator insulator bushing 3 of the invention is preferably made of porcelain and has the usual insulating skirts 19. At locations 21, 22, 23 and 24 uniformly spaced between ground and the line potential end of the bushing there are pairs of oppositely extending peripheral projections 26—27 which provide annular insulator surfaces 28 (Fig. 2) having a C-shaped profile. These surfaces each have a generally cylindrical or slightly tapered intermediate exposed insulator body surface 29 which join oppositely curving insulator body surfaces 30—30' recessed within the insulator bushing. The insulator bushing surfaces 28 are coated with a conductive glaze 32 following the C-shaped profile of these surfaces.

Split metal rings 31 surround each of the conductive glazed areas 21 through 24 of the insulator bushing and are tightly secured thereto. Each ring has an internally threaded boss 31' which receives the end of an associated connector rod 10'.

Means are provided for applying or controlling the voltage at the points 21 through 24 so that the voltage gradient along the insulator bushing is uniform. As is apparent from the description above, the operating voltage of the cable system with which the terminator is associated exists between the upper adaptor ring 6 and the bottom adaptor ring 15 of the insulator bushing 3. A proper voltage gradient along the insulator bushing above described is obtained by fixing the voltage at the points 21, 22, 23 and 24, respectively, 20%, 40%, 60% and 80% of the operating voltage of the cable system with which the terminator is associated.

A condenser assembly 11 controls the potential gradient along the insulator bushing 3.

The condenser assembly is supported on a hollow base 33 which in turn is mounted upon a support wall 17 which also supports the terminator 1.

The condenser assembly 11 comprises a stack of series connected condenser elements 34, 35, 36, 37 and 38. The condenser elements may be conventional-type, high voltage condensers having the usual outer porcelain insulators 39. The condensers are constructed to enable the stacking of one element on top of the other. To this end, each element has mounting flanges 40. The mounting flanges of adjacent condenser elements are bolted together by bolts 40'. The flanges also form terminals for the associated condenser elements, and the condenser elements are each thereby connected in series with the adjacent capacitor element.

The opposed mounting flanges 40—40 form bosses 41 which receive the ends of the horizontally extending connector rods 10' extending from the split rings 31 of the terminator.

The uppermost terminal of the uppermost capacitor element 38 of the stack is electrically connected to and covered by a hollow, generally spherical electrostatic shield 42. The connector rod 10 electrically joins the shield 42 with the line terminal 4 of the terminator. The lower terminal of the bottom condenser element 34 of the stack is connected to the base 33 of the condenser assembly which in turn is grounded through the metal support 17. The condenser stack assembly is therefore connected in series between points of the terminator having, respectively, line and ground potential.

It can be shown that the currents flowing in the condenser elements 34 through 38 increase progressively from the top to the bottom of the condenser stack. Therefore, to equalize the voltage drop across the condenser elements the values of the elements are graded in proportion to the currents flowing through them, so that the same voltage drop appears across each of the elements. In this manner, voltage at points 21 through 24 of a terminator insulator bushing is held at respectively 20, 40, 60 and 80 percent of the line voltage, respectively.

In compliance with the requirements of the patent statutes I have here shown and described a preferred embodiment of my invention. It is, however, to be understand that the invention is not limited to the precise construction here shown, the same being merely illustrative of the principles of the invention. What I consider new and desire to secure by Letters Patent is:

1. In combination, a terminator for a high voltage cable, said terminator including an outer insulator into which the cable or cable conductor is to extend, a line terminal at one end of the insulator, and a grounded member at the opposite end of the insulator; and an impedance unit mounted separately of said terminator to one side of said terminator and being electrically connected between said grounded member and said line terminal, said impedance unit having a number of tap-off points therealong, and respective connector means connecting axially spaced portions on said outer insulator to the tap-off points of said impedance unit which fix the potentials of said axially spaced portions on said insulator, the sum of the axial lengths of the portions of the outer insulator that are connected to the impedance unit being less than the sum of the axial lengths of the insulator between said portions.

2. In combination, a terminator for a high voltage cable, said terminator including an outer insulator into which the cable or cable conductor is to extend, a line terminal at one end of the insulator, and a grounded member on which the insulator is mounted at a location spaced from the line terminal end thereof; and an impedance unit mounted separately of said terminator and being electrically connected between said grounded member and said line terminal, said impedance unit having a number of tap-off points therealong, and respective connector means connecting axially spaced portions on said outer insulator to the tap-off points of said impedance unit which fix the potentials of said axially spaced portions on said insulator at values providing a predetermined potential gradient along said insulator, the sum of the axial lengths of the portions of the outer insulator that are connected to the impedance unit being less than the sum of the axial lengths of the insulator between said portions.

3. In combination, a terminator for a high voltage cable having an outer insulator into which the cable or cable conductor is to extend, a line terminal at one end of the insulator, a grounded member surrounding the insulator and spaced from the line terminal end thereof, and a number of separate conductive areas contiguous to and surrounding said outer insulator at axially spaced locations between the line terminal end and the grounded member, the sum of the axial lengths of the conductive areas being less than the sum of the axial lengths of the insulator between said conductive areas; and an impedance unit mounted to one side of said insulator and electrically connected between ground and the line terminal, said impedance unit having a number of tap-off points therealong, and respective connector means connecting the conductive areas of said insulator to the tap-off points of said impedance unit which fix the potentials of said conductive areas at values providing a uniform potential gradient along said insulator.

4. In combination, a terminator for a high voltage cable including an outer insulator having an end into which the cable conductor extends, a line terminal at the other end of the insulator which terminal is connected to the cable conductor, a grounded member at said first-mentioned end of the outer insulator, and a number of separate conductive areas contiguous to and surrounding said outer insulator at equally and axially spaced locations between the line terminal end and the grounded member, the sum of the axial lengths of the conductive areas being less than the sum of the axial lengths of the insulator between said conductive areas; and an impedance assembly mounted separately and to one side of said terminator, said impedance assembly comprising a number of series connected impedance elements of progressively increasing value, means connecting the high impedance end of the impedance assembly to said line terminal, means connecting the low impedance end of said impedance assembly to said grounded member, and means connecting the respective junctures of said impedance elements to corresponding conductive areas of said insulator.

5. In combination, a high voltage outer insulator having a line terminal at one end and a grounded member surrounding the insulator and spaced from the line terminal end, and a number of separate conductive areas contiguous to and surrounding said outer insulator at axially spaced locations between the line terminal end and the grounded member, the sum of the axial lengths of the conductive areas being less than the sum of the axial lengths of the insulator between said conductive area; and an impedance assembly mounted separately and to one side of said insulator and electrically connected between said line terminal and grounded member, said impedance assembly comprising a number of series connected impedance elements, and means connecting the respective junctures of said impedance elements to corresponding conductive areas of said insulator, the relative values of said impedance elements being such that the voltage drops therein are proportional to the spacing between the spaced conductive areas to which they are connected so that the axial voltage gradient along the outer insulator is uniform.

6. In combination, a terminator for a high voltage cable comprising an outer insulator having an end into which the cable extends, a line terminal at the other end of said outer insulator, a grounded member at the first-mentioned end of the outer insulator, and said outer insulator having a number of axially spaced insulating skirts which are interrupted at a number of axially spaced points by pairs of oppositely extending peripheral projections providing annular insulating surfaces having C-shaped profiles, each of said annular insulator surfaces being coated with a conductive glaze; and an impedance unit connected between said line terminal and said ground member, said impedance unit having a number of tap-off points therealong, and means connecting said glazed areas of said insulator to tap-off points of said impedance unit which fix the potential of said glazed areas at values providing a uniform potential gradient along said insulator.

7. In combination, a terminator for a high voltage cable comprising an outer insulator having an end into which the cable is to extend, a line terminal at the other end of said insulator, a grounded member at said first-mentioned end of the insulator, said insulator having a number of axially spaced pairs of oppositely extending peripheral projections providing annular insulator surfaces, respective conductive bands surrounding said annular surfaces, the sum of the axial lengths of the respective conductive bands being less than the sum of the axial lengths of the insulation between the bands, and an impedance unit connected between said line terminal and grounded member and having tap-off points connected to said conductive bands on said outer insulator to control the potential of the latter to provide a uniform potential gradient along the insulator.

8. In combination, a terminator for a high voltage cable including an outer insulator having an end into which the cable extends, a line terminal at the other end of the insulator which terminal is connected to the inner cable conductor of the cable, a grounded member at said first-mentioned end of the outer insulator, and a number of separate conductive areas contiguous to and surrounding said outer insulator at axially spaced locations between the ends thereof, the sum of the axial lengths of the conductive areas being less than the sum of the distances between the conductive areas; and an impedance assembly mounted separately and to one side of said terminator and electrically connected between said line terminal and ground, said impedance assembly comprising a number of series connected impedance elements, and means connecting the juncture of said impedance elements to corresponding conductive areas of said insulator, the relative values of said impedance elements being graded from a maximum at one end to a minimum at the opposite end.

References Cited in the file of this patent

UNITED STATES PATENTS

| | | |
|---|---|---|
| 1,869,168 | Proctor et al. | July 26, 1932 |
| 2,068,624 | Atkinson | Jan. 19, 1937 |
| 2,423,596 | Hollingsworth | July 8, 1947 |

FOREIGN PATENTS

| | | |
|---|---|---|
| 352,635 | Great Britain | July 16, 1931 |